US012763969B2

(12) United States Patent
Sprague et al.

(10) Patent No.: US 12,763,969 B2
(45) Date of Patent: Oct. 13, 2026

(54) SYSTEM TO ASSURE A RESPONSE FROM AN IDENTIFIED, MEASURED AND VERIFIED AI

(71) Applicant: Sproquet Corp., New York, NY (US)

(72) Inventors: Michael Sprague, New York, NY (US); Steven Sprague, Richmond, MA (US)

(73) Assignee: Sproquet Corp., New York, NY (US)

( * ) Notice: Subject to any disclaimer, the term of this patent is extended or adjusted under 35 U.S.C. 154(b) by 182 days.

(21) Appl. No.: 18/900,335

(22) Filed: Sep. 27, 2024

(65) Prior Publication Data

US 2025/0112783 A1 Apr. 3, 2025

Related U.S. Application Data

(60) Provisional application No. 63/586,874, filed on Sep. 29, 2023.

(51) Int. Cl.

| | |
|---|---|
| ***H04L 9/32*** | (2006.01) |
| ***H04L 9/08*** | (2006.01) |
| *G06N 20/00* | (2019.01) |

(52) U.S. Cl.

CPC .......... *H04L 9/3247* (2013.01); *H04L 9/0822* (2013.01); *H04L 9/3297* (2013.01); *G06N 20/00* (2019.01)

(58) Field of Classification Search

CPC ... H04L 9/3247; H04L 9/0822; H04L 9/3297; H04L 9/3239; H04L 9/50; G06N 20/00

See application file for complete search history.

(56) References Cited

U.S. PATENT DOCUMENTS

| | | | | |
|---|---|---|---|---|
| 12,470,381 | B2 * | 11/2025 | Baldwin | G06N 20/00 |
| 2019/0296917 | A1 * | 9/2019 | Roth | H04L 9/3247 |
| 2022/0414237 | A1 * | 12/2022 | Lally | G06F 21/604 |

(Continued)

FOREIGN PATENT DOCUMENTS

| | | | |
|---|---|---|---|
| CN | 114327803 A | * | 4/2022 |

OTHER PUBLICATIONS

"How to watermark & sign in AI models", Jul. 21, 2023, obtained online from <https://medium.com/@techlatest.net/how-to-watermark-sign-in-ai-models-f751e1cc0447>, retrieved on May 21, 2026. (Year: 2023).*

(Continued)

*Primary Examiner* — Zhimei Zhu

(74) *Attorney, Agent, or Firm* — Hamilton, Brook, Smith & Reynolds, P.C.

(57) ABSTRACT

An AI verification system using existing capabilities provided by trusted computing and blockchain technology. The AI verification system can be optimized to assure that input from a client system sent to an AI system to make a request is not tampered with in creation or transmission. The response from the AI system is processed by the AI verification system to ensure that it is secure for delivery and presentation back to the client including the cyber assurance data collected from the operating environment of the AI system. The AI verification system can produce sufficient forensic data to assure a response from AI systems and services is trusted and verified. The AI verification system may be encapsulated in and implemented as an AI verification embedded microcontroller.

20 Claims, 7 Drawing Sheets

(56) References Cited

U.S. PATENT DOCUMENTS

| | | | | |
|---|---|---|---|---|
| 2023/0396435 | A1* | 12/2023 | Baldwin | H04L 9/30 |
| 2024/0221079 | A1* | 7/2024 | Martire | G06Q 40/04 |
| 2024/0430090 | A1* | 12/2024 | Zhang | G06F 21/602 |
| 2025/0023714 | A1* | 1/2025 | Kumar | H04L 9/0819 |

OTHER PUBLICATIONS

Barclay, I., Preece, A.D., Taylor, I.J., Radha, S.K., & Nabrzyski, J. (2021). “Providing assurance and scrutability on shared data and machine learning models with verifiable credentials”. Concurrency and Computation: Practice and Experience, 35. (Year: 2021).*

Regazzoni, F., Palmieri, P., Smailbegovic, F., Cammarota, R. and Polian, I. (2021), Protecting artificial intelligence IPs: a survey of watermarking and fingerprinting for machine learning. CAAI Trans. Intell. Technol, 6: 180-191. (Year: 2021).*

* cited by examiner

SYSTEM TO ASSURE A RESPONSE FROM AN IDENTIFIED, MEASURED AND VERIFIED AI

RELATED APPLICATION(S)

This application claims the benefit of U.S. Provisional Application No. 63/586,874, filed on Sep. 29, 2023, the entire teachings of which are incorporated herein by reference.

BACKGROUND

Artificial intelligence (AI) creates a new generation of transformative technologies designed to simulate human intelligence. AI may be transformative, but it has the potential for misuse. Trust is an important component in the adoption and integration of AI. While there has been tremendous growth and investment in AI systems and tools in recent years, the AI trust gap remains. When a person is able to entrust a machine to perform a task or job that otherwise would have been entrusted to qualified humans, the gap can be closed.

SUMMARY

The present disclosure includes AI verification computational systems and methods that address trust and vulnerability issues in AI systems and tools. The growing integration of AI into everyday computational processes introduces a new information assurance vulnerability. The risk is that in the round-trip transaction created by a requestor the data sent, processed, and received can be accounted for. The digital assurance is that the intended request resulted in the response returned. The creation and binding of the digital forensic evidence to the response that the systems used operate as expected with appropriate privacy mechanisms. The industry has anticipated a need for high-assurance operations in endpoint devices for years. Already available and deployed technologies from Blockchain, Trusted Computing, and Machine Learning/AI can be used to assure that a requested operation is executed by a known AI to produce a verifiable result assuring the complete operation.

AI introduces a new information assurance risk as the Large Language Models are constantly learning, and it is more than likely that the AI will not reproduce the exact same answer when asked the same question more than once. Methods to test and verify the output, and to record the evidence of a transaction, require a novel approach. Information Quality is a critical factor in effective digital operations. Assuring the integrity of the end-to-end AI process for a transaction can be critical to the integrity, quality, and trustworthiness of any AI system.

The present disclosure discloses embodiments directed to AI verification systems and methods that can provide technical solutions to help ensure user privacy and the integrity, quality, security, and trustworthiness of the end-to-end AI process for a transaction. Example embodiments of the present disclosure can verify trustworthiness of an artificial intelligence (AI) system In an example AI verification computational system and computational method embodiment, an digitally signed response can be computationally verified from an identified AI system operating in a measured environment. A digitally signed request can configured using a private key associated with a client system.

In an embodiment, the digitally signed request can be transmitted to a data assurance computing system with a public key configured to verify an integrity of the digitally signed request.

In an embodiment, the data assurance computing system can validate the digitally signed request by transmitting the digitally signed request to the artificial intelligence (AI) system through a secure application programming interface (API) call.

In an embodiment, the data assurance computing system can configure a digitally signed response binding identity and assurance data from the artificial intelligence (AI) system using keying material provided in the digitally signed request. The client system can verify that the digitally signed response is the result of a specific verified request by, for example, authenticating (i) the digitally signed response digital signature, and (ii) the binding identity and assurance data configured by the data assurance computing system.

In an embodiment, a decentralized application (DAPP) may be used that is paired with a smart contract and a blockchain wallet the private key. The DAPP may be used to provide the private key and a signing operation for submission of the request. An identity of the request may be recorded and timestamped on the blockchain including a hash of the digital signature. A storage location of the original signed request may be recorded on the blockchain. The public key and wallet address may be used to provide the data assurance computing system necessary information to verify the integrity of the original request. The public key and wallet address may be used to create the digitally signed response. The DAPP may be used to validate and time stamp the digitally signed response and record on the blockchain a digitally signed response validation process was or was not completed successfully.

In an embodiment, a single transaction identifier (ID) to link all of the steps in the transaction to a single identifier.

In an embodiment, a trusted execution environment (TEE) may be used to provide the private key and a signing operation for submission of the digitally signed request. The trusted execution environment may be used to verify the digitally signed response validation process was complete and recording a secure event log.

In an embodiment, a trusted platform module (TPM) may be used to provide the private key and the signing operation for submission of the digitally signed request. The TPM may be used to verify the digitally signed response validation process was complete and recording a secure event log.

In an embodiment, a blockchain may be used to record a reference digital hash of each verified step of a boot and loading process of the AI system either as individual steps or as an accumulated hash.

In an embodiment, the blockchain may record the location of at least one reference log file for future validation of the boot and loading process. An application may be used to verify the boot and loading process of an AI instance to assure an identity of the AI process represents a unique and repeatable system that can be measured by matching the current signatures to previous recorded reference measurements stored on a blockchain.

In an embodiment, a pre-processor may be configured to verifies an integrity of the AI system, prior to submitting a request, by comparing a current integrity measurement of the AI system with a previously recorded reference signature recorded on a blockchain.

In an embodiment, a pre-process service may be configured to perform a validation of each step of an installation and creation of the pre-process service to measure an integrity of the process and record each step using a digital signature. The signatures may be combined, wherein combining creates a single reference signature and a secure log file of the measured process steps. The reference signature may be verified by performing current measurements of the system as it is launched, including securely logging each step. The reference signature may be compared to the current signature. The processing of the request may be appended with the result and including location information for the log file.

In an embodiment, a post-process service may be used to perform a validation of each step of an installation and creation of the post-process service to measure the integrity of the post-process service, and recording each step using a digital signature. Digital signatures may be combined to create a single reference signature and a secure log file of the measured process steps. A reference signature may be verified by performing current measurements of the AI system as it is launched including securely logging each step. The reference signature may be compared to a current signature. The processing of the digitally signed response may be appended with the results of the integrity measurement and including location information for the log file.

In an embodiment, integrity measurement results of a pre-process service (preprocessor) may be aggregated with (i) the artificial intelligence (AI) system, and (ii) the post-process service (postprocessor). This may include binding the integrity data with a signed envelope of the digitally signed response data to assure that measured systems provide the processing and creation of the digitally signed response, and binding the location data for the log files for future reference.

In an embodiment, the computational system or computational method may be configured to maintain, via post-process (post-processor), an access control system to the log file data based on a unique transaction identity and a requestor identity to assure that only the requestor identity can have access to the log file data in the future.

In an embodiment, the computational system or computational method may be configured to validate, via a client application, the result of an integrity measurement for each component of the system pre-processor, the AI system, and the post-processor; The system may be presenting, via the client application, a result of at least one integrity measurement for each component of the system pre-processor, the AI system, and the post-processor. The system may be facilitating, via a client application, access to the measurement integrity logs associated with the integrity measurements of the systems.

In an embodiment, an AI verification computational system or computational method may be provided to assure a digital identifier for an AI instance. A digital identifier may be created based on a secure channel of access and communication established by a pre-processor verifying and preparing the request. A validator may be validating multiple zero trust controls integrated into the secure channel of access and communication established by the pre-processor verifying and preparing the request. A recorder may be recording a verification of details of a zero trust architecture controls in a log file and digitally signing the file and or the individual controls. The system can generate a digital signature of the verified controls log file and includes that digital signature and the location of the log file into the digitally signed response that is returned from the AI system. The system can be configured to validate at least one third-party cyber security controls used to supervise the multiple service environment. The system may be configured to receive (e.g. via a receiver or session handler), from third-party cyber security controls, log information that is collected and signed. The system may construct a manifest of the specific log information and signatures with the signatures combined to form a single signature that represents a complete manifest. The aggregated signatures may be recorded along with the location of the manifest of log files into the digitally signed response that is returned from the AI system.

In an embodiment, a computational system or computational method may be configured to inventory and verify the data used to construct and train a large language model (LLM). A data set may be obtained from an identified source. The provenance of each obtained data set may be verified.

In an embodiment, the computational system or computational method may be configured to validate a large language model data loader used to ingest external information into the model. The computational system or computational method may be configured to measure and validate integrity measurements for each component of the data loader. The computational system or computational method may be configured to record and sign the integrity measurements for each component of the data loader. The computational system or computational method may be configured may be configured to bind the results of the integrity measurement and including location information for the log file with the large language model.

The computational system or computational method may be configured to validate a data compiler used to build the large language model. The computational system or computational method may be configured to validate and measure integrity measurements for each software component (or computer readable executable instruction) of a data loader. The computational system or computational method may be configured to record and sign the integrity measurements for each software component (or computer readable executable instruction) of the data loader. The computational system or computational method may be configured to bind the results of the integrity measurements and including location information for the log file with the large language model.

In an embodiment, a computational system or computational method may be provided to enable payment for service using blockchain tokens. The computational system or computational method may be configured to use the registration of the same wallet private key used to register the service. The computational system or computational method may be configured to present, via the DAPP, the user with the required amount of tokens to receive a response. The computational system or computational method may be configured to sign, via the user wallet, and submitting the message to the smart contract to transfer the tokens. The computational system or computational method may be configured to use the token transaction record as part of the cyber security assurance process to bind the payment information into the results returned.

The computational system or computational method may be configured to use a multi-signature transaction to incorporate proof of compliance to a list of policies. The computational system or computational method may be configured to register a multi-signature wallet with one of the signatures controlled by a pre-process server. The computational system or computational method may be configured to establish, within the pre-process server, a list of policies that must be adhered to and verified prior to payment being confirmed. The computational system or computational method may be configured to confirm the policy list with a multi-signature transaction registering the established list. The computational system or computational method may be configured to confirm a list of pre-established polices, digitally signing the results, and confirming the multi-signature transaction for execution. The computational system or computational method may be configured to include, via the pre-process server, a multi-signature transaction hash and a signed manifest of policy controls into information confirmed prior to the submission of a request to the service.

In an embodiment, a computational system or computational method may be provided to enable control of a service and access to information using private keys and secure messages. The computational system or computational method may be configured to adjust a configuration of the service using instructions that are embodied in a signed message either on a blockchain or not on a blockchain that uses the same private key or derived private key to assure the secure message comes from the intended owner.

The computational system or computational method may be configured to use a secure message to alter the configuration of an AI process. A secure process may be used to alter or permission external data sources that can be used by an AI process to process a request.

The computational system or computational method may be configured to use a secure message to provide access to funds or tokens that can be used to pay for AI systems as part of a request.

The computational system or computational method may be configured to use a secure message to gain access to an inventory of log data or manifest data recorded by a pre- or post-process service or AI that was collected during the process of a previous transaction.

The computational system or computational method may be configured to use a secure message to supply a specific transaction ID and collect the recorded manifest and controls data collected for that specific transaction ID.

The computational system or computational method may be configured to use a secure message to supply access credentials for external data sources or reference data required to process the request, said credentials are used by a DAPP to enable an AI system to have access to certain files or information needed to process the request and return a result.

In an embodiment, a computational system or computational method may be provided to record attestation data on a blockchain with confidentiality. The computational system or computational method may be configured to return a blockchain transaction associated with the recording of attestation signatures as part of the transaction to the owner of a private key used to sign a request. The computational system or computational method may be configured to retain, via the owner, access to log files that are signed and the attestation signatures used to validate the authenticity of the log file and the time of signature. The computational system or computational method may be configured to associate, via the owner, a blockchain transaction ID that references a record on a blockchain that contains the attestation information with the location of the log files and the access control information necessary to access those files. The computational system or computational method may be configured to verify the information in the files by the attestation signatures protected on the blockchain providing forensic evidence to assert the last measured state of a computational environment or service at the time of use.

The computational system or computational method may be configured to protect the confidentiality of a transmitted instruction and/or response by: (i) creating an encryption key pair for a user that is registered with a pre-process and a post-process service to enable encrypted messages to be both sent and received from the service; (ii) encrypting each request message sent to the service, wherein the service decrypts the message prior to transmission to the Artificial Intelligence (AI) system; and (iii) encrypting each response message transmitted back to the user where the user has retained the necessary keys to decrypt the response. A portion of the encrypted request and response may be transmitted to the AI system where it is decrypted using preregistered keys and not exposed to the pre- and post-process services.

In an embodiment, a computational system or computational method may be provided to assure the integrity of an AI) system via confidential and trusted computing practices. The computational system or computational method may be configured to execute the AI system within a measured confidential computing environment. The computational system or computational method may be configured to validate the AI system environment externally, and the resulting information is logged in a log file and digitally signed. The computational system or computational method may be configured to enable binding a digital signature of the log file and the location information of the log file to the response data to provide the evidence components were validated.

The computational system or computational method may be configured to hold the keying information used to protect the confidentiality of data within the confidential computing environment. The computational system or computational method may be configured to enable encrypting and decrypting a request and response within the secure boundary of the confidential computing boundaries.

The computational system or computational method may be configured to use local device hardware to enhance the security of both the request and the response. The computational system or computational method may be configured to utilize the local trusted computing principles to assure the protection of private keys and message generation. The computational system or computational method may be configured to measure computational environment including any attestation signatures within the message process to assure the measured state of the computational environment.

The computational system or computational method may be configured to enable the user to confirm that the message sent is the intended message by using client technologies of secure display. The computational system or computational method may be configured to display the whole request or only the signature for the request or a portion of the request. The computational system or computational method may be configured to confirm the message, by the user, using a secure consent method, a button, a pin/password, a biometric or a token. The computational system or computational method may be configured to enable leveraging the technologies of Trusted Platform Modules and trusted computing standards to protect keys and validate signatures.

The disclosed computational system or computational method may be embedded in a microcontroller. The AI embedded microcontroller preferably includes a hardware cryptography accelerator engine, secure boot functionality, secure protection ROM, and pre-boot authentication of the system firmware to prevent security attacks. Preferably, the AI embedded microcontroller is optimized for public key operations and can accelerate AES-HMAC-SHA-1 bulk encryption. The AI embedded microcontroller may be optimized for smart payment, fingerprint modules, and secure IoT devices. The AI verification embedded microcontroller may be integrated into small-scale devices, such as smartphones, wearables, and autonomous vehicles, and smart appliances. This allows the disclosed computational system or computational method embedded in such devices to learn from their environment, adapt to user preferences, and respond to changes autonomously. By embedding disclosed AI verification embodiments, the verification process is performed locally, without relying on disparate computing resources. This allows for faster processing, improved performance, and reduced latency.

The disclosed computational system or computational method may be configured to leverage Trusted Execution Technology and Arm Trustzone to protect keys and validate signatures.

The computational system or computational method may be configured to leverage Intel Manageability Engine and VPRO technologies to protect keys and validate signatures.

Example disclosed computational system or computational method embodiments may be embedded or integrated into data assurance computing system, or DAPP is encapsulated in a hybrid CPU/Trusted Platform Module (TPM) Processor Unit with an embedded cryptographic packet processor based hardware accelerator optimized to improve packet processing for trusted computing applications. Example disclosed computational system or computational method embodiments may be implemented or embedded in an assurance computing system, or DAPP is encapsulated in a secure digital memory card.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Many artificial intelligence (AI) systems are operated by sending a request and then expecting an answer. These systems are typically placed behind layers of security and secure access control systems, such as username and password controls. These layers of security may be isolated and can result in potential security vulnerabilities which may be exploited in e-commerce systems, for example.

Embodiments of the disclosure can address such security vulnerabilities by providing a system configured to verify that a response to a request from an AI system is trusted. With the advent of both Blockchain and trusted computing technology, example embodiments of the present disclosure can enable user computing devices to securely sign messages and submit the signed messages securely to an AI system, such as an AI service. Embodiments of the disclosure may provide the necessary fail-safes and key management to assure that the response from the AI system can be digitally signed and verified.

To assure a specific request resulted in a specific response, embodiments of the disclosure may leverage user controlled cryptographic keys. The user maintains the registration of these keys either locally, remotely, or using the blockchain as a registration trust authority. For example, the user may use a blockchain wallet to create a new private key and register the public key on the blockchain. The user would then sign a prompt message using their private key and transmit it to the AI system. The AI system would validate the message signature using the public key on the blockchain and process the user's request. The AI response would then be signed and secured using the user's public key and returned to the user. Finally, the user would validate the signature using their private key. This would prove that a specific prompt resulted in the specific AI response.

Figure 1:
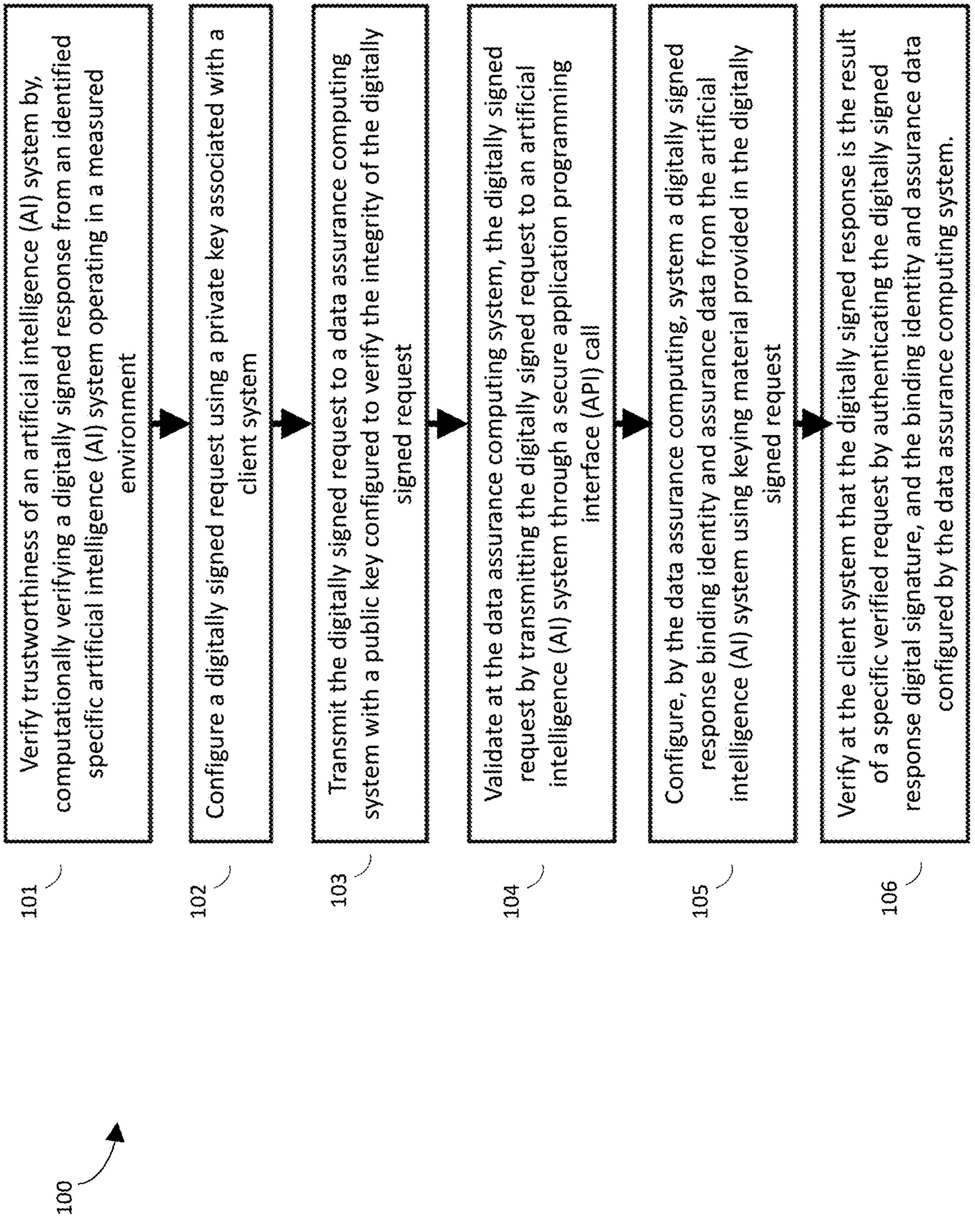
FIG. 1 is a flow diagram of an example embodiment of an AI verification system or method optimized to verify trustworthiness of an artificial intelligence (AI) system, according to an embodiment.

FIG. 1 is a flow diagram of an example embodiment of an AI verification system or method optimized to verify trustworthiness of an artificial intelligence (AI) system, according to an embodiment. The AI verification system 100 verifies 101 trustworthiness of an artificial intelligence (AI) system by, computationally verifying a digitally signed response from an identified specific artificial intelligence (AI) system operating in a measured environment. Next, AI verification system 100 configures 102 a digitally signed request using a private key associated with a client system. AI verification system 100 continues by transmitting 103 the digitally signed request to a data assurance computing system with a public key configured to verify the integrity of the digitally signed request. Thereafter the AI verification system 100 validates 104 at the data assurance computing system, the digitally signed request by transmitting the digitally signed request to an artificial intelligence (AI) system through a secure application programming interface (API) call. Next, AI verification system 100 configures 105, by the data assurance computing, system a digitally signed response binding identity and assurance data from the artificial intelligence (AI) system using keying material provided in the digitally signed request. The AI verification system 100 verifies 106 at the client system that the digitally signed response is the result of a specific verified request by authenticating the digitally signed response digital signature, and the binding identity and assurance data configured by the data assurance computing system.

In some embodiments of the system, the AI system is a registered service and would be issued a digital identity. In one embodiment, a cryptographic hash, digital fingerprint or digital twin of this digital identity is registered on the blockchain. The quality of this digital identity would depend both on the registration process and level of protection of the private keys used to assert the identity. The identity, or proof of the identity, may then be included as part of the digitally signed AI response.

In some embodiments of the system, the AI system would be a measured and verified service where cyber security controls would be logged and hashed creating a provable record of the state of the AI system and the infrastructure providing the service. Both the record of information logged, and the verification data, would be recorded and a digitally signed hash and a URL would be included to locate records as part of the digitally signed AI response.

In the AI system there may be information logged as to the original source material or update material used to train the Large Language Model (LLM). The log of this information would be digitally hashed. The record of LLM source information logged, as well as the verification data, would be recorded and a digitally signed hash and a URL to locate the recorded records would be included as part of the digitally signed AI response.

In some embodiments, the user computing device may be configured to provide a payment for the AI system that is embedded within the prompt request by using a specific blockchain compatible token. The token would be submitted at the same time as the prompt and from the same private key. In some cases, the hash of the prompt might be included with in the payment transaction process to facilitate linking of the events. The AI system would then validate that the blockchain payment has been made and execute the transaction.

In some embodiments, the user may have pre-registered a multi-signature wallet account with the AI system and defined a set of policies that the service must validate before allowing the transaction to proceed. The user would then initiate a transaction and sign the request with or without a payment. The AI system would receive the request and execute the pre-described policy steps. The service would record the results and sign them. If the policy steps are within parameters, or executed as prescribed, then the service would sign the multi-signature transaction, thus approving the submission of the request to the AI system. The signed policy steps and verification data would be recorded and a digitally signed hash and a URL to locate the recorded records would be included as part of the digitally signed AI response.

In some embodiments of the system, the user computing device uses a signed request to the AI system, using their private key or a derivation, for access to any of the data recorded by the service relating to transactions initiated by that specific wallet identity. The service would validate and record the request and provide the information requested.

In some embodiments of the system, the prompt request may contain control codes that are digitally signed and instruct the AI system to configure internal capabilities or controls to match the specific request. Any configuration and control information would be digitally recorded and signed. The control information is logged, and the verification data would be recorded and a digitally signed hash and a URL to locate the recorded records would be included as part of the digitally signed AI response.

In some embodiments of the system, the prompt request may contain instructions, permission and/or access control/payment for external information systems that are digitally signed and instruct the AI system to access external information. The AI system would access the external information and may record the data accessed. The interaction would be digitally recorded and signed. External information access would be logged, and the verification data would be recorded and a digitally signed hash and a URL to locate the recorded log records would be included as part of the digitally signed AI response.

In some embodiments of the system, any, or all, of the hashes generated may include information recorded on one or more blockchains to assure the information is recorded in an immutable and shared basis, and to simplify the reliance on any single entity to assure the integrity of the data. The user would be able to use the recorded information on a blockchain to establish trustworthy timestamps and to prove systems state data has not been altered.

In some embodiments of the system, the wallet might pre-register or pre-arrange an encryption key for a specific transaction, or group of transactions, that would allow the transmitted prompt to remain confidential and the transmitted response to remain confidential. This would allow the user to securely communicate directly with the AI system with no risk of observation by the network operators, or even the hosting platforms for the AI system. For example, the user would create a prompt that is locally encrypted using the prearrange keys and then transmitted across the insecure communications to the AI system. The AI system would decrypt the message internally and process the request. The resulting response would be Encrypted using the pre-arranged keys and returned to the user for secure display on their device.

In some embodiments of the system, the AI system would be certified to prevent even super admins from viewing live transaction data, and all local log files would be protected or not recorded. The measured system would be used in connection with encrypted requests to assure that the service provider cannot trace or observe an encrypted request and response. Current technologies, such as Microsoft confidential computing for example, would provide capabilities that would secure an AI system and assure the process and data is confidential. When coupled with an encrypted prompt and the binding of evidence of the state of the platform into the response the user can be confident that their request and response was confidential and cannot be reviewed or discovered.

In some embodiments of the system, the user may use device security technologies that are not blockchain related to provide the key management, key protection and data processing. Devices contain a range of options to create secure messages and authentication including Trusted Execution Environment (TEE), Arm Trust Zone, Trusted Platform Modules (TPM) and processor or chipset technologies from, for example, Intel, AMD, Nvidia and others.

Figure 2:
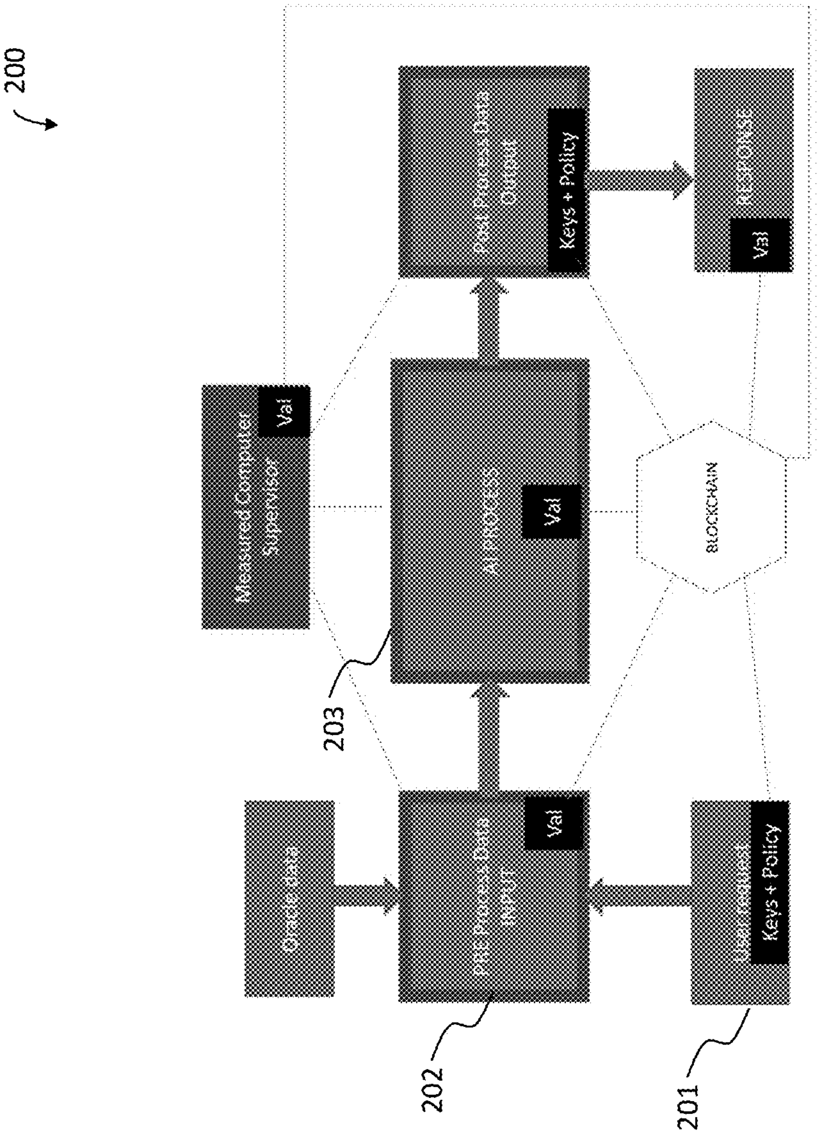
FIG. 2 is a block diagram of a AI verification system configured to verify trustworthiness of an artificial intelligence (AI) system according to an embodiment.

FIG. 2 shows an example embodiment 200 of a computational system configured to verify trustworthiness of an artificial intelligence (AI) system according to an embodiment. The user request 201 is validated by the pre-process data input 202, as well as the AI process 203.

Figure 3:
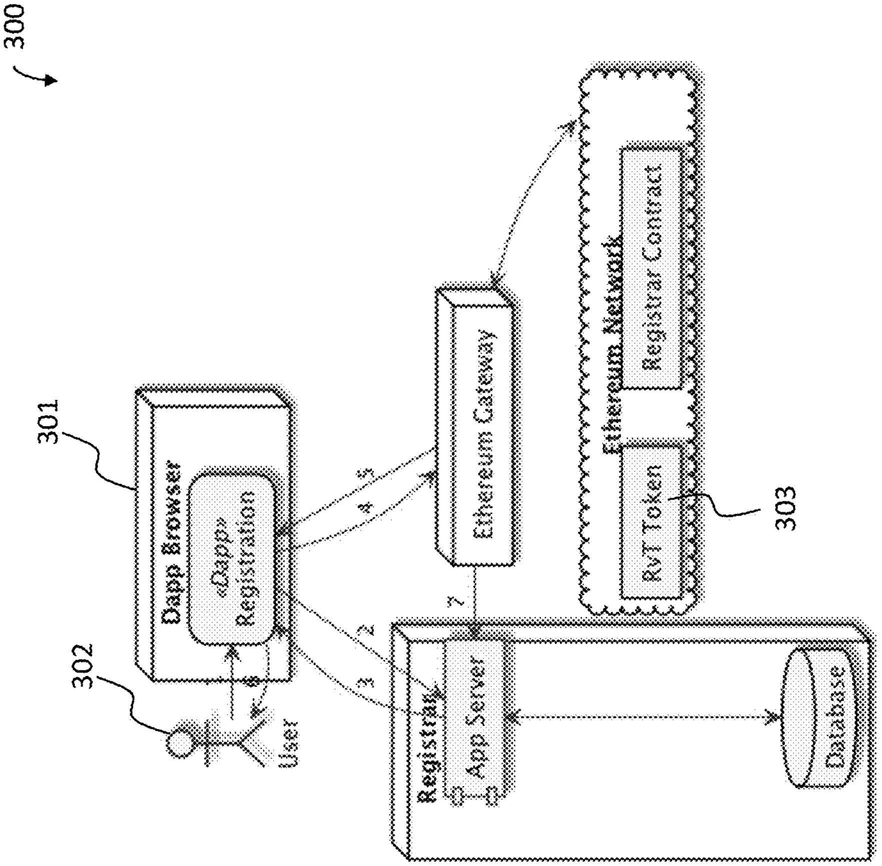
FIG. 3 is a block diagram of a AI verification system configured to verify trustworthiness of an artificial intelligence (AI) system with a DAPP according to an embodiment.

An example implementation of assured response from a known AI system is disclosed. An embodiment of the invention uses a blockchain wallet to construct a secured request. FIG. 3 is a diagram 300 showing the use of a blockchain wallet and a Decentralized Application (DAPP) 301 providing the interface to collect a secure request. The user 302 leverages the DAPP interface 301 to input the request and any ancillary information that may be required by the pre-processor 201 in FIG. 2. The DAPP browser 301 calculates a hash of the data and prepares a blockchain transaction for execution. The user then selects their wallet identity and a blockchain token 303 to be used to pay for the transaction, for example RvT. The user then uses their preferred wallet software to verify and sign the transaction request and attached data. The DAPP browser 301 then submits the transaction to the pre-process service using the pre/post process blockchain address and secures the transaction and the request data hash on the blockchain.

The pre-process service performs a cyber security inspection and validation of the service and creates a cyber security status log as well as a hash of the log. The pre-process service verifies the blockchain record of the submitted request meets requirements for the AI system and combines the status log hash and the location of the log information and submits the request to the AI system.

The AI system performs a cyber security inspection and validation of the service and creates a cyber security status log and a hash of the log. The AI system computes a result and returns the result to the post-process service and the status hash and the location of the log information.

The post-process service performs a cyber security inspection and validation of the service and creates a cyber security status log and a hash of the log. The post process service then appends the status has for each service and the location data for the respective log files and digitally signs the response with the pre/post process identity key (this signing transaction may or may not be recorded on the blockchain). The post process server then transmits the response back to the DAPP.

The DAPP presents the response and verifies the hash of the digital signature using the post process public key to verify the response, and presents the user with confirmation that the message is secure. As part of the response the user is provided with any of the cyber security log location data and hashes of the log files enabling the users to confirm the cybersecurity status of the pre- and post-services and the AI system to the extent they are measured.

AI Registration

The embodiments of the present invention may perform specific registration and strong API authentication on a server-to-server basis. The pre/post-process service would maintain and verify this direct authentication using API Keys, PKI Certificates or other methods. The result would be a unique instance of a specific AI system provided.

The embodiments of the invention may record and monitor any and all cyber security controls provided by the third party AI system to determine the real time health and integrity of the service. The pre/post-process service would record this information and provide a snapshot of the data at the time a request is processed by the AI system. Using the principles of Zero Trust architecture the pre/post-process service would continuously verify the AI system, creating a measured and verified service.

The disclosed embodiments may leverage multiple third party cyber security controls, applications, and standards to assure the digital health and integrity of the components. The systems will broadly leverage trusted computing methods and standards to provide the capabilities. Multiple independent controls will provide log data that can be captured in a snapshot to assure the status information at the time of a transaction is known. It is expected that the log information collected will be digitally signed by the service, and the location of the signed log file recorded. The hash of the status log and the locations can then be compiled into a simple record or even rolled up into a summary record that is signed and recorded. It is expected that the records will contain a time stamp to assure continuity and integrity. The quality, granularity, and frequency of verification are used to establish the overall quality and trustworthiness of the system.

Method for Assuring the Integrity of a Large Language Model.

Figure 4:
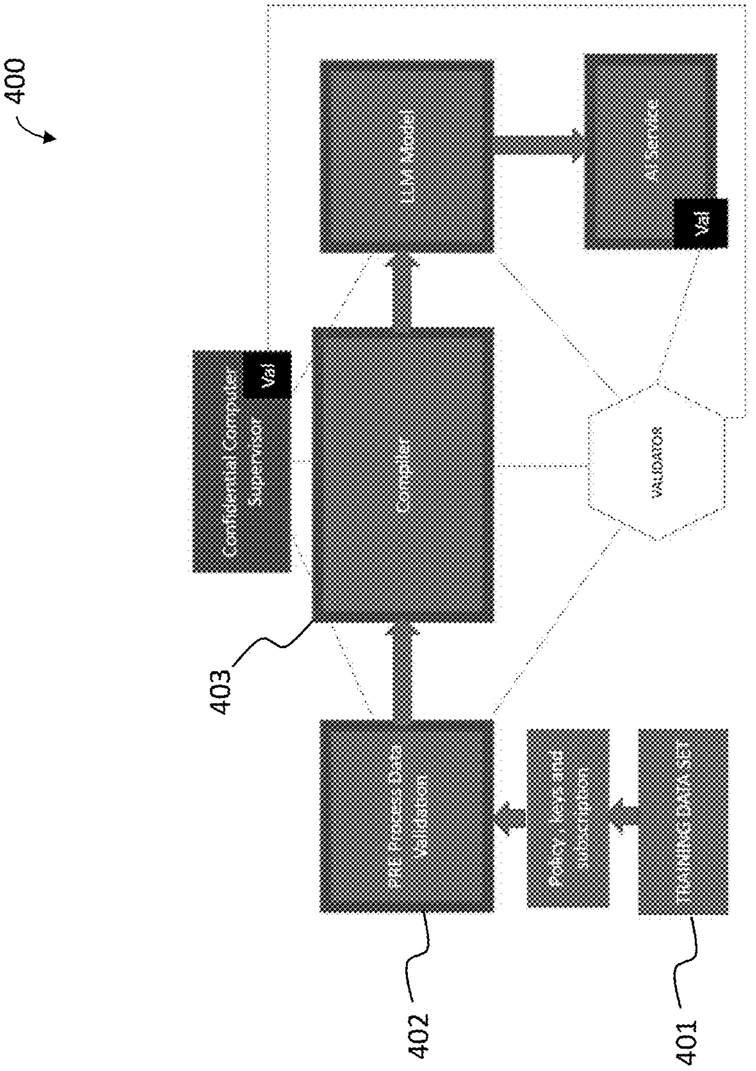
FIG. 4 is a block diagram of a AI verification system configured to verify trustworthiness of a third party AI system, tool, component according to an embodiment.

Example embodiments may verify and log all of the information consumed to construct or train a large language model. The embodiment of a system 400 is shown in FIG. 4. The training data set 401 is accessed from a single or multiple sources using a range of typical cyber assurance models. This information is then verified and logged by the preprocess data validation service 402. In addition, the pre-process validation service is verified to be operating in a healthy and verified state. All data validation is performed and verified as the data is consumed. In some embodiments of the system the compiler 403 of the data would also be verified to be operating in a healthy and measured state.

In many cases the training of a Large Language Model (LLM) is ongoing and a snap shot of the state of the system would indicate the full data set that has been used to train the LLM, the data source information and the health and integrity of the complier. This information can be provided to the AI system to assert the foundational data that was used in the model to produce a result.

The Use of Tokens to Integrate Payment and Policy as Part of Service

Example embodiments may use tokens to pay for service. The DAPP in FIG. 3 can be configured to request payment for service. The user will be required to make payment using a blockchain token designed for that purpose and compatible with the system. The smart contract for the DAPP is programed with the destination wallet address for payment. Once the user configures the details of the request and submits the transaction to the DAPP, they will be required to sign a blockchain transaction with their wallet and transfer a sufficient number of tokens to pay for the service. The service will receive the tokens in their designated wallet and confirm the receipt of payment on the blockchain.

Some embodiments of the service would use a multi signature wallet to enable acceptance of payment only after certain cybersecurity policies have been verified. The user executed a process to set up a multisig wallet and the pre-process server confirms the configuration. At the time of registration the procedure to establish policies that are for all transactions or the method to supplement transactionally specific policies would be recorded using the DAPP and confirmed by the users private key. Once the multi-signature service is established the user can then submit transaction using the multisignature address and keys.

The pre-process service would execute policies that are preconfigured by the service at multisig registration and/or requested by the user for a specific transaction. These policies would be verified and logged. Upon completion of the policies, or an agreed threshold of the policies, the pre-process server would use it's private key to confirm the payment transaction and allow it to proceed. If the policies failed to validate, then the service would reject the transaction and the payment would be returned to the user's account.

Proof the payment and policies have been executed would be captured by the pre-process server in log files and digitally hashed. The digital signed hash of these files would then be included in the health and integrity information log for the specific request and appended to any other cyber assurance data in the response.

Use of Digital Identity for Controls

Example embodiments may use secure messages to transmit control instruction to the system. The system does not create a user name and password for access to data logs or specific information. The system uses a set of commands that are digitally signed messages. These messages are then signed by the private key or a derived private key to grant permission to the pre/post-processor or AI system to respond to the specific control command.

Access to all previous log file data on the health and integrity of the system is provided using this mechanism. The hashed log files can be requested for a specific transaction by providing the location information and the transaction ID. The system will then transmit the log file information to the User who can verify the log file based on the hash information embedded in the Response data.

The request for original log data may require payment using tokens or some other means of payment.

The request for logged data may be also be logged, and reference the requesting parties public key/digital identity.

Example embodiments may extend secure message to contain controls or options including potential payment options that would instruct the AI system to process data in a specific way or to produce output in a specific way. These control instructions will be formatted by the local application or DAPP and may be confirmed by the user. Once delivered to the pre-processor, the instructions will be verified processed and delivered to the AI system or other components in the system to configure detailed options.

Example embodiments may extend the secure message to contain instructions to access and integrate external information sources. These instructions may include secure access control credentials and payment methods including a multi-signature process for security. These control instructions will be formatted by the local application or DAPP and may be confirmed by the user. Once delivered to the pre-processor the instructions will be verified processed and delivered to the AI system or other components in the system to configure detailed options using external data sources.

The Use of Blockchain as a Shared Immutable Storage of Assurance Information

Example embodiments may use one or more blockchains to secure and timestamp transaction data and digital signatures. Blockchain infrastructure uses a variety of methods to build a chain of transactions events, where each event signs the previous event creating a cryptographically assured chain.

Creating Confidential Instruction Using Encryption

Example embodiments use may encryption to assure the confidentiality of an instruction. The user may use the DAPP to preregister a transaction encryption key pair with the pre-processor service or the AI system. When the user requires an encrypted instruction the DAPP will select a random transaction key. The transaction key can then be used to encrypt the instruction and then the transaction key will be encrypted using the pre/post-process service public key or AI system key. The now encrypted transaction key can be included within the signed instruction message. The pre-process server will then receive the signed message and verify the integrity of the message. The pre-process service or the AI system will then use the respective private key to decrypt the message key and then use the message key to decrypt the instruction. The clear text request can then be processed by the system. For some systems it is possible that there is both a pre-process service key pair for encryption of control data and AI system key for the request assuring the request is only know by the AI system.

The response data may also be returned encrypted using the same transaction key used to encrypt the original request. The post-process service would use the transaction key to encrypt the data in the response prior to signing the response. The response is then transmitted to the DAPP for display to the user. The DAPP verifies the response and then uses the transaction key to decrypt the response.

Confidential Computing Used to Assure Confidentiality of the AI Service

Some embodiments of the invention may apply the technologies of confidential computing to assure the confidentiality of the entire AI process and prevent access to any details of request and responses. Confidential computing uses the principles of both hardware and software trusted computing to assure the platform running the AI system is operating as expected, and to secure an internal encryption keys used to secure transactions and data. The securing of the keys and the encryption process prevents observation even by the highest level administrators of the AI system. Once the service is placed in production mode the systems protecting the keys for transactions would only be available to decrypt or encrypt critical data if the AI system is running in a validated condition. The user can then transmit an encrypted request through the pre-processor and after validation that encrypted request is only decrypted within the trust boundary of the AI system. The response would then be encrypted within the trust boundary of the AI system and delivered to the post process for digital signing and inclusion of the hashes of the integrity logs for the AI system. Finally, the encrypted and signed response is delivered to the DAPP to be decrypted and presented to the user.

Creating Instructions Using Device Security

Example embodiments may verify and sign secure messages in a secure execution environment on a user device prior to transmission. The secure execution environment also execute code that generates and stores device keys (e.g., public and private key pairings) applied in transactions. The secure execution environment allows verification of the message and authorization from the user to transmit a request and binds any device health assurance information or hash to the request.

The web customarily requires that end-users of the service conduct authentication, such as requiring the user to enter a username and password to connect, and then a Secure Socket Layer (SSL) to secure a channel of communications. The risk of a browser attack that might alter a prompt, or a Domain Name System (DNS) hijacking that might result in communication with an unintended AI, or a multitude of other cybersecurity breaches have impacted e-commerce over the years are possible.

Example embodiments may provide authentication, message security and payment by the device of the end user, rather than (or addition to) authentication by the end user. A device, unlike an end user, can engage without irritation in a cryptographic process well beyond the capacity of any human end-user authentication or encryption and using any of thousands of credentials that can be stored in the device's hardware. The device can also engage in the cryptographic assurance over and over without fatigue. Further, such device authentication, encryption and payment can be transparent to the user (or further secured with a personal identification number (PIN) or other user consent) and provides a level of assurance the response from an AI system can be relied on without hassling the user to be a verifier. Moreover, most of the time end users engage with the same devices they own for the same interactions. By leveraging these devices to conduct authentication, user interaction consistency can be rewarded with immediate access for users and increased the level of confidence the response can be relied on.

There are a number of widespread tools used in example embodiments to facilitate authentication, message encryption and payment by a device of an end user. These tools ranges from hardware backed device identity to full trusted execution environments.

A blockchain wallet is a tool that can manage one or many private keys and can use the keys to sign or encrypt certain data. Blockchain wallets are also capable of supporting multiple signature transactions requiring more than one set of wallets to confirm a transaction either locally or geographically dispersed. Many blockchain wallets are built on top of a trusted computing base and with specific hardware and software assurances that can be digitally validated.

Embodiments may leverage the trusted display capabilities of different devices to assure the message being requested has not been altered prior to signing and transmission. One the user confirms the message is correct then the message is signed and transmitted to the AI system.

A trusted execution environment (TEE) is a tool configured on the user device to execute applications (e.g., service provider application). The installation and execution of applications (apps) on the user device is meant to be very simple. However, there is a class of apps that can benefit greatly from strong assurance of their origin and opaque separation from the execution of other apps, as provided by a TEE. Unlike an app running on the primary operating system (OS) (Rich OS) and memory stack of the user device, an app running in the TEE of the user device has access to cryptographic primitives that enable the app to be executed without snooping by the OS. In ideal circumstances, the app executing in the TEE also has direct access to user input and display to ensure a private interaction with the operator of the user device.

Both proprietary and standards based solutions in support of a trusted execution environment for a user device have worked their way into the supply chain, and may be used in certain embodiments herein. The Trusted Platform Module (TPM), for instance, is a security chip embedded on the motherboard of most modern personal computers. The TPM technology is specified by the Trusted Computing Group (TCG), a non-profit consortium of dozens of major vendors. The TPM technology was designed largely in support of enterprise network security, but has played a huge role to play in simplifying the consumer web. TPM's have been used in enterprise security for approximately half a dozen years and are now widely prevalent in modern personal computers.

A TPM is a relatively simple technology that serves three basic purposes: public key infrastructure (PKI), basic input/output system (BIOS) integrity, and encryption. While the TPM technology has been pursued for well over a decade, only recently have devices configured with TEE have become available. The TPM platforms and associated tools are now reaching the level of maturity required for consumer use (in consumer devices). Deploying an app into the TEE of a device is akin to delivering a dedicated hardware device, as execution and data in the TEE are cryptographically isolated from any other functions of the device in the primary operating system.

The TPM secure chip has no identity of its own, but can be configured to generate the key pairs (public and private keys) of example embodiments. In example embodiments, these key pairs, also referred to as attestation identity keys (AIKs), can be marked as "non-migratable" so that the private half of the key pair will never be visible outside the hardware (TEE environment). This provides an opportunity to establish a device (machine) identity that cannot be cloned by other device or applications. Currently deployed TPMs (version 1.2) are limited to RSA and SHA-1, while TPM (version 2.0) are more agile.

A TPM implements an Endorsement Key (EK). The EK is installed during manufacture and can be used to prove that the TPM is in a fact a real TPM. A device configured with a TPM loads Platform Configuration Registers (PCRs) during its boot sequence. During the boot sequence, beginning with the firmware of the device, each component in the boot process measures its state and the state of the next process, and records a PCR value for the measurement. As the PCRs are captured in the tamperproof TPM of the device, a reliable quote or measurement of the system's BIOS integrity can subsequently be requested. A PCR does not capture what actually happens to the device components during execution, but only captures, through a series of hashes, that the state of these components have not changed over time. These captured hashes are particularly important for protection against the most serious and otherwise undetectable attacks, where a hacker compromises the device Bios or installs a secret hypervisor. Combined with an assurance signature from virus scanning software, a the device or system controlling access to the device (e.g., access control system or authentication server) can establish a reliable state of health of the device.

TPMs may also provide bulk encryption services in example embodiments. In example embodiments, encryption keys may be generated by the device in the TPM, but the encryption keys not stored in the TPM. Instead the keys are encrypted with a TPM bound Storage Root Key and returned to the requesting process (e.g., executing at the service provider, access control server, or the device) for storage. When the process needs to encrypt or decrypt data, the process first retrieves and mounts the stored encryption key. The process then decrypts the encryption key in the hardware executing the process, and makes the key available for ciphering. As with most TPM keys, the encryption keys can be further protected with a password if desired.

Trustonic provides a trusted execution environment across a broad array of smart devices, which may be used in example embodiments. Trustonic (http://www.trustonic.com) is a joint venture of ARM, G+D and Gemalto. The goal of Trustonic is to enable the secure execution of sensitive application services. Trustonic is an implementation of the Global Platform standard for Trusted Execution Environments. Apps configured and loaded for execution in the Trustonic TEE are signed and measured. Devices supporting Trustonic provide an isolated execution kernel, so that a loaded app on these devices cannot be spied on by any other process running on the devices, including debug operations on a rooted device. Trustonic was formed in 2012 and now ships to approximately half a dozen device manufactures and supports a dozens of service providers. Over 200 million devices are now shipped with Trustonic support.

Intel vPro also provides a trusted execution environment, which may be used in example embodiments. Intel vPro is collection of technologies built into modern Intel chip set. New devices/machines marketed with vPro support the Intel TXT Trusted Execution technology. Intel vPro offers a secure processing environment in the management engine (ME) of a device that enables protected execution of numerous cryptographic functions. The Intel vPro capabilities included in the deployment of TPM 2.0 functionality implemented as an app in the ME. The ME also supports secure display functions for conducting fully isolated communications with the user of the device. In this manner an app executing in the ME can be controlled by the user with a substantially reduced risk of compromise.

ARM TrustZone also provides a trusted execution environment, which may be used in example embodiments. ARM TrustZone provides the silicon foundations (primitives) that are available on all ARM processors. These primitives isolate a secured world of execution from the common execution space of a device. ARM provides the designs that are then built into a number of standard processors. To use the TrustZone primitives, apps can either be deployed at the device as part of system firmware by the manufacturer or can be delivered after the fact through third party tools like Trustonic, Linaro or Nvidia's open source micro kernel.

Some embodiments may apply such trusted execution technologies (e.g., Blockchain Wallets, Trustonic, Intel vPro, TrustZone) into a set of services for enhancing the security of a Request, the validation and verification of the response, the validation of the system generating the response and the capturing and recording the health and integrity of the device at the time a transaction is performed.

Figure 5:
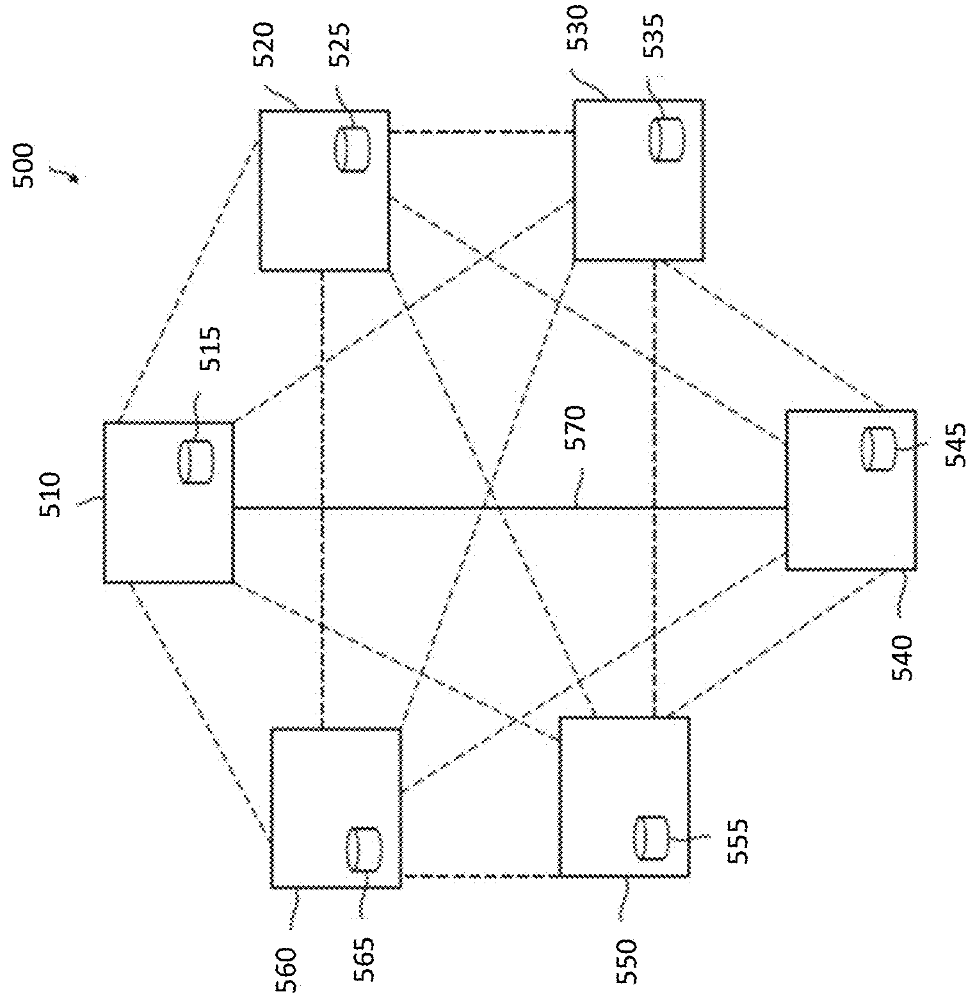
FIG. 5 is a simplified block diagram of an example embodiment of a distributed blockchain ledger computer-implemented system.

FIG. 5 is a simplified block diagram of an example embodiment of a blockchain network 500, also referred to interchangeably herein as a distributed ledger network 500, that may be accessed according to an example embodiment. The blockchain network 500 is a distributed ledger peer-to-peer (P2P) network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 500 to transfer and record, in the form of blockchain based records, movement of tokens. Such blockchain based records form a cryptographically secured backlinked list of blocks.

The distributed ledger network 500 includes multiple computing devices configured as nodes 510, 520, 530, 540, 550, 560 of the distributed ledger network 500. Each node 510, 520, 530, 540, 550, 560 locally stores and maintains a respective identical copy 515, 525, 535, 545, 555, 565 of the blockchain ledger in memory communicatively coupled to the node. The nodes exchange messages within the distributed ledger network 500 to update and synchronize the ledger stored and maintained by each node. The nodes may also execute decentralized applications (decentralized apps or "dApps"), such as via smart contracts, for processing the messages. An example message transmission 570 from node 510 to node 540 may be used to exchange a token in the distributed ledger network 500 as shown in FIG. 5. One or more of nodes 510, 520, 530, 540, 550, 560 may be configured as a component, such as a custodial node, in connection with an example embodiment. Dotted lines between each set of nodes in the distributed ledger network 500 indicate similar transmissions that may be exchanged between any other set of nodes in the distributed ledger network 500. The messages may include a confirmed transfer for recording data associated with a token being transferred, a blockchain public key for each of one or more parties participating in the transfer.

Referring back to FIG. 1, according to an example embodiment, the network may be a blockchain and may be an Ethereum network; however, it should be understood that the blockchain network may be any suitable known blockchain networks. Ethereum is a decentralized network of computers with two basic functions: (i) a blockchain that can record transactions and (ii) a virtual machine (VM), that is, an Ethereum Virtual Machine (EVM), that can produce smart contracts. Because of these two functions, Ethereum is able to support decentralized applications (dApps). These dApps are built on the existing Ethereum blockchain, piggybacking off its underlying technology. In return, Ethereum charges developers for computing power in its network, which can only be paid in Ether, the only inter-platform currency. Depending on its purpose, a dApp may create ERC-20 (Ethereum Request for Comments 20) tokens to function as a currency. According to an example embodiment, fungible tokens (FTs) disclosed herein may be ERC-20 tokens or any other suitable FT known to those of skill in the art.

The code of a smart contract may be uploaded on the EVM, which may be a universal runtime compiler or browser, to execute the smart contract's code. Once the code is on the EVM, the code may be the same across each Ethereum node to be run to check whether conditions are met, such as a condition for a balance reaching a trade value prior to expiration of an expiration term.

Ethereum has a long history of developed standards. For example, ERC-20 is a standard that defines a set of six functions that other smart contracts within the Ethereum ecosystem can understand and recognize. ERC-20 is a protocol standard and to be compliant with ERC-20, the functions need to be included in a token's smart contract. ERC-20 outlines a specific list of rules that a given Ethereum-based token must deploy, simplifying a process of programming the functions of tokens on Ethereum's blockchain. These include, for instance, how to transfer a token (by an owner or on behalf of the owner), such as may be employed for transferring fungible tokens (FTs) of a buyer, and how to access data (e.g., name, symbol, supply, balance, etc.) concerning the token, such as a balance of a fungible token (FT).

Figure 6:
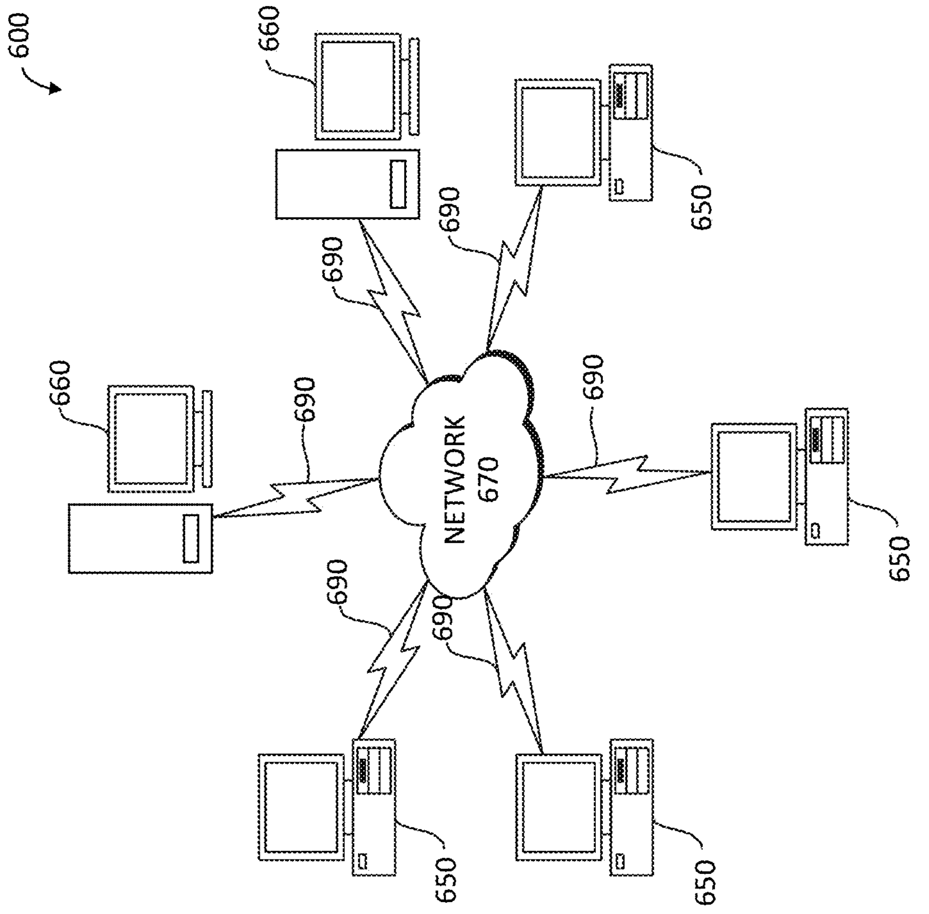
FIG. 6 is a simplified block diagram of an example implementation of a network in communication with an embodiment.

An example implementation of AI verification system 100 (FIG. 1) may be implemented in a software, firmware, or hardware environment. FIG. 6 illustrates one such example digital processing environment 600 in which embodiments of AI verification system 100 may be implemented. Client computer(s)/device(s) 650 and server computer(s)/device(s) 660 provide processing, storage, and input/output (I/O) devices executing application programs and the like.

Figure 7:
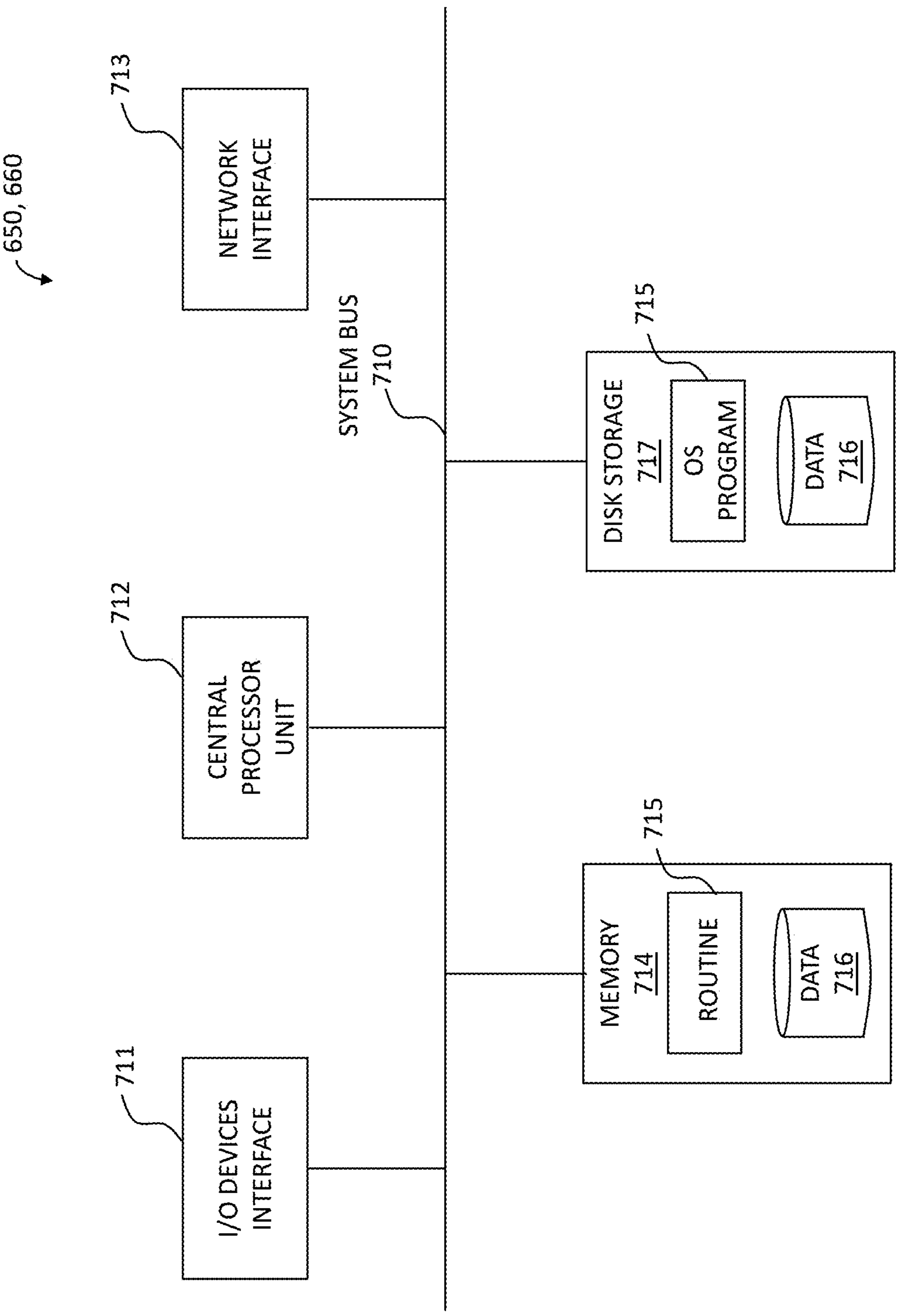
FIG. 7 is a simplified block diagram of any internal structure of a computer/computing node in a processing environment of an embodiment.

Client computer(s)/device(s) 650 may be linked 690 directly or through communications network 670 to other computing devices, including other client computer(s)/device(s) 650 and server computer(s)/device(s) 660. Referring to FIGS. 6 and 7 (the latter described in more detail hereinbelow), network 670 utilizes AI verification system 100 according to an embodiment of the invention.

The communication network 670 may be part of a wireless or wired network, a remote access network, a global network (e.g., the Internet), a worldwide collection of computers, local area networks (LANs) or wide area networks (WANs), and gateways, routers, and switches that may use a variety of known protocols (e.g., TCP/IP, Bluetooth®, etc.) to communicate with one another. Communication network 670 may also be a virtual private network (VPN) or an out-of-band (OOB) network or both. Further, communication network 670 may take a variety of forms, including, but not limited to, a blockchain network, a distributed ledger network, a data network, voice network (e.g., landline, mobile, etc.), audio network, video network, satellite network, radio network, and pager network. Other known electronic device/computer network architectures are also suitable. For example, client computer(s)/device(s) 650 may include nodes shown in FIG. 5, which run user applications that enable a user to communicate with an application to determine whether a user meets a work requirement. A digital wallet may be configured on each user device 510, 520 (FIG. 5) to store tokens. Client computers 650 (FIG. 6) of the AI verification system 100 (FIG. 1) may be configured with a trusted execution environment (TEE) or trusted platform module (TPM), where the application may be run, and the digital wallet of a user may be stored.

Referring again to FIG. 6, server computer(s)/device(s) 660 of the computer-implemented system may be configured to include a server that that executes the application. For example, the application of server computer(s)/device(s) 660 may, first, determine whether a computing node in the blockchain network, e.g., network 670, has satisfied a work requirement and, second, produce a determination result and pair, in computer memory (e.g., memory 714 of FIG. 7), an indication of the determination result with an identifier of the computing node or an identifier of a digital asset of the computing node, such as an address of a digital wallet associated with the computing node. The work requirement can help ensure that the computing node is not malicious or a bot in the system. The application of server computer(s)/device(s) 660 also facilitates a transfer of a utility token by moving the utility token to, for example, a wallet. For another example, server computer(s)/device(s) 660 or client computer(s)/device(s) 650 may comprise peer computing devices (nodes) 510, 520, 530, 540, 550, 560 of a distributed blockchain ledger 500 of FIG. 5, which use smart contracts to execute and record transactions implemented via tokens.

FIG. 7 is a block diagram of any internal structure of a computing/processing node (e.g., client computer(s)/device(s) 650 or server computer(s)/device(s) 660) in the processing environment 600 of FIG. 6, which may be used to facilitate displaying audio, image, video, or data signal information. Each computer/device 650, 660 in FIG. 7 may contain a system bus 710, where a bus is a set of actual or virtual hardware lines used for data transfer among components of a computer or processing system. System bus 710 may essentially be a shared conduit that connects different elements of a computer system (e.g., processor, disk storage, memory, I/O ports, etc.), thereby enabling transfer of data between elements or components.

Continuing with FIG. 7, attached to system bus 710 is an I/O device interface 711 for connecting various input and output devices (e.g., keyboard, mouse, touch screen interface, displays, printers, speakers, audio inputs and outputs, video inputs and outputs, microphone jacks, etc.) to a computer/device 650, 660. Network interface 713 may allow a computer/device to connect to various other devices attached to a network, for example network 670 of FIG. 6. Memory 714 may provide volatile storage for computer software instructions 715 and data 716 used in some embodiments to implement software modules/components of AI verification system 100 (FIG. 1).

Software components 715, 716 of the AI verification system 100 (e.g., AI verifier, digital wallet, encapsulated oracle, bridge aggregator, cross-chain virtual machine (VM), encoder/decoder, Trusted Execution Environment (TEE), blockchain layer 1 virtual machine (VM), wallet interface, gateway, digital wallet, applets, authentication site, cybersecurity controller, service applications, and the like) described herein may be configured using any programming language known in the art, including any high-level, object-oriented programming (OOP) language, such as Python or Solidity. The computer-implemented system may include instances of processes that enable execution of transactions and recordation of transactions. The system 100 may also include instances of a scoring engine, which can be implemented by, e.g., a server 660 or a client that communicates with the server 660, using, for example, secure sockets layer (SSL), Hypertext Transfer Protocol Secure (HTTPS), or any other suitable protocol known to those of skill in the art.

In an example mobile implementation, a mobile agent implementation of embodiments may be provided. It may use, for example, the Extensible Messaging and Presence Protocol (XMPP) protocol, or any other suitable protocol known to those of skill in the art, to tether a digital wallet engine/agent 715 on a user device 650 to a server 660. The server 660 may then issue commands to the user device on request. The mobile user interface framework to access certain components of system 100 (FIG. 1) may be based on, e.g., XHP, Javalin, and/or Wireless Universal Resource FiLe (WURFL), or other suitable known framework(s), interface(s), or combinations thereof. In another example mobile implementation for the iOS operating system (OS) and its corresponding application programming interface (API), the Cocoa Touch API may be used to implement the client-side components 715 using Objective-C or any other suitable known high-level OOP language that adds Smalltalk-style messaging to the C programming language.

Disk storage 717 may provide non-volatile storage for computer software instructions 715 (equivalently "OS program") and data 716 may be used to implement embodiments of system 100. The system may include disk storage accessible to a server computer 660. The server computer may maintain secure access to records related to, e.g., digital wallets, associated with system 100. Central processing unit (CPU) 712 may also be attached to system bus 710 and provide for execution of computer instructions.

In some embodiments, processor routines 715 and data 716 may be computer program products. For example, aspects of system 100 may include both server-side and client-side components.

In an example embodiment, the disclosed AI verification system may be embedded in a microcontroller. By embedding the AI verification system in a microcontroller, the AI verification system can be encapsulated and protected from modification or tampering. The AI embedded microcontroller preferably includes a hardware cryptography accelerator engine, secure boot functionality, secure protection ROM, and pre-boot authentication of the system firmware to prevent security attacks. Preferably, the AI embedded microcontroller is optimized for public key operations and can accelerate AES-HMAC-SHA-1 bulk encryption. The AI embedded microcontroller may be optimized for smart payment, fingerprint modules, and secure IoT devices. The AI verification embedded microcontroller may be integrated into small-scale devices, such as smartphones, wearables, and autonomous vehicles, and smart appliances. This allows the disclosed computational system or computational method embedded in such devices to learn from their environment, adapt to user preferences, and respond to changes autonomously. By embedding disclosed AI verification embodiments, the verification process is performed locally, without relying on disparate computing resources. This allows for faster processing, improved performance, and reduced latency.

In other embodiments, authenticators/attesters may be contacted via, e.g., blockchain gaming systems, instant messaging applications, video conferencing systems, VoIP (voice over IP) systems, etc., all of which may be implemented, at least in part, in software 715, 716. Further, in yet other embodiments, client-side components interfacing with system 100 may be implemented as an application programming interface (API), executable software component, or integrated component of the OS configured to provide access to a hardware implementation of an example embodiment on a Trusted Platform Module (TPM) executing on a computing node device or gateway 650. In one such embodiment, an instance of the system 100 may be implemented as an embedded gateway cryptoprocessor (cryptographic processor) configured to support application-to-blockchain and blockchain-to-blockchain integrations. The embedded gateway cryptoprocessor may be a dedicated computer-on-a-chip or microprocessor for carrying out cryptographic transaction operations, embedded in a hardware security module (HSM) with security measures providing failsafe tamper resistance. The embedded gateway cryptoprocessor may be configured to output decrypted data onto a bus in a secure environment, in that the embedded gateway cryptoprocessor does not output decrypted data or decrypted program instructions in an environment where security cannot be maintained. The embedded gateway cryptoprocessor does not reveal keys or executable instructions on a bus, except in encrypted form, and zeros keys to thwart attempts at probing or scanning.

In an embodiment, software implementations 715, 716 may be implemented as a computer-readable medium capable of being stored on a storage device 717, which provides at least a portion of the software instructions for system 100. Executing instances of respective software components of system 100, such as instances of system 100, may be implemented as computer program products 715, and may be installed by any suitable software installation procedure, as is well known in the art. In another embodiment, at least a portion of the system software instructions 715 may be downloaded over a wired and/or wireless connection via, for example, a browser SSL session or through an app (whether executed from a mobile or other computing device). In other embodiments, the system 100 software components 715 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s) known in the art).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method to verify trustworthiness of an artificial intelligence (AI) system, the method comprising:

computationally verifying a digitally signed response from an identified specific artificial intelligence (AI) system operating in a measured environment by:

configuring a digitally signed request using a private key associated with a client system;

transmitting the digitally signed request to a data assurance computing system with a public key configured to verify an integrity of the digitally signed request;

validating, at the data assurance computing system, the digitally signed request by transmitting the digitally signed request to the artificial intelligence (AI) system through a secure application programming interface (API) call;

configuring, by the data assurance computing system, a digitally signed response binding identity and assurance data from the artificial intelligence (AI) system using keying material provided in the digitally signed request; and verifying at the client system that the digitally signed response is the result of a specific verified request by authenticating the digitally signed response digital signature, and the binding identity and assurance data configured by the data assurance computing system.

2. The computer-implemented method of claim 1, wherein computationally verifying a digitally signed response from an identified specific artificial intelligence (AI) system operating in a measured environment further includes:

using a decentralized application (DAPP) that is paired with a smart contract and a blockchain wallet to provide the private key and a signing operation for submission of the request;

recording and timestamping an identity of the request on the blockchain including a hash of the digital signature;

recording a storage location of the original signed request on the blockchain;

using the public key and wallet address to provide the data assurance computing system necessary information to verify the integrity of the original request;

using the public key and wallet address to create the digitally signed response; and using the DAPP to validate and time stamp the digitally signed response and record on the blockchain a digitally signed response validation process was or was not completed successfully.

3. The computer-implemented method of claim 1, wherein computationally verifying a digitally signed response from an identified specific artificial intelligence (AI) system operating in a measured environment further includes: using a blockchain to record a reference digital hash of each verified segment of a boot and loading process of the AI system either as individual segments or as an accumulated hash;

using the blockchain to record the location of at least one reference log file for future validation of the boot and loading process; and using an application to verify the boot and loading process of an AI instance to assure an identity of the AI process represents a unique and repeatable system that can be measured by matching the current signatures to previous recorded reference measurements stored on a blockchain.

4. The computer-implemented method of claim 3, wherein computationally verifying a digitally signed response from an identified specific artificial intelligence (AI) system operating in a measured environment further includes:

using a pre-process component that verifies an integrity of the AI system, prior to submitting a request, by comparing a current integrity measurement of the AI system with a previously recorded reference signature recorded on a blockchain.

5. The computer-implemented method of claim 1, wherein computationally verifying a digitally signed response from an identified specific artificial intelligence (AI) system operating in a measured environment further includes:

using a pre-process service to perform a validation of each segment of an installation and creation of the pre-process service to measure an integrity of the process and record each segment using a digital signature;

combining the signatures, wherein combining creates a single reference signature and a secure log file of the measured process segments;

verifying the reference signature by performing current measurements of the system as it is launched, including securely logging each segment;

comparing the reference signature to the current signature; and appending the processing of the request with the result and including location information for the log file.

6. The computer-implemented method of claim 1, wherein computationally verifying a digitally signed response from an identified specific artificial intelligence (AI) system operating in a measured environment further includes:

using a post-process service to perform a validation of each segment of an installation and creation of the post-process service to measure the integrity of the post-process service, and recording each segment using a digital signature;

combining digital signatures to create a single reference signature and a secure log file of the measured process segments;

verifying a reference signature by performing current measurements of the AI system as it is launched including securely logging each segment;

comparing the reference signature to a current signature; and appending the processing of the digitally signed response with the results of the integrity measurement and including location information for the log file.

7. The computer-implemented method of claim 6, wherein computationally verifying a digitally signed response from an identified specific artificial intelligence (AI) system operating in a measured environment further includes:

aggregating integrity measurement results of a pre-process service, the artificial intelligence (AI) system, and the post-process service;

binding the integrity data with a signed envelope of the digitally signed response data to assure that measured systems provide the processing and creation of the digitally signed response; and binding the location data for the log files for future reference.

8. The computer-implemented method of claim 7, wherein computationally verifying a digitally signed response from an identified specific artificial intelligence (AI) system operating in a measured environment further includes:

maintaining, via post-process, an access control system to the log file data based on a unique transaction identity and a requestor identity to assure that only the requestor identity can have access to the log file data in the future.

9. The computer-implemented method of claim 1, wherein computationally verifying a digitally signed response from an identified specific artificial intelligence (AI) system operating in a measured environment further includes:

validating, via a client application, the result of an integrity measurement for each component of the system pre-processor, the AI system, and the post-processor;

presenting, via the client application, a result of at least one integrity measurement for each component of the system pre-processor, the AI system, and the post-processor; and facilitating, via a client application, access to the measurement integrity logs associated with the integrity measurements of the systems.

10. The computer-implemented method of claim 1, wherein computationally verifying a digitally signed response from an identified specific artificial intelligence (AI) system operating in a measured environment further includes:

creating a digital identifier based on a secure channel of access and communication established by a pre-processor verifying and preparing the request;

validating multiple zero trust controls integrated into the secure channel of access and communication established by the pre-processor verifying and preparing the request;

recording a verification of details of a zero trust architecture controls in a log file and digitally signing the file and or the individual controls; and a system that generates a digital signature of the verified controls log file and includes that digital signature and the location of the log file into the digitally signed response that is returned from the artificial intelligence (AI) system.

11. The computer-implemented method of claim 10, wherein computationally verifying a digitally signed response from an identified specific artificial intelligence (AI) system operating in a measured environment further includes:

validating at least one third-party cyber security controls used to supervise the multiple service environment;

receiving, from third-party cyber security controls, log information that is collected and signed;

constructing a manifest of the specific log information and signatures with the signatures combined to form a single signature that represents a complete manifest; and recoding the aggregated signatures along with the location of the manifest of log files into the digitally signed response that is returned from the artificial intelligence (AI) system.

12. The computer-implemented method of claim 1, further comprising protecting the confidentiality of a transmitted instruction and/or response by:

creating an encryption key pair for a user that is registered with a pre-process and a post-process service to enable encrypted messages to be both sent and received from the service;

encrypting each request message sent to the service, wherein the service decrypts the message prior to transmission to the Artificial Intelligence (AI) system; and encrypting each response message transmitted back to the user where the user has retained the necessary keys to decrypt the response.

13. The computer-implemented method of claim 12, wherein a portion of the encrypted request and response is transmitted to the Artificial Intelligence (AI) system where it is decrypted using preregistered keys and not exposed to the pre- and post-process services.

14. The computer-implemented method of claim 13, further comprising:

holding the keying information used to protect the confidentiality of data within a confidential computing environment; and encrypting and decrypting a request and response within the secure boundary of confidential computing boundaries.

15. The computer-implemented method of claim 1, further comprising:

using local device hardware to enhance the security of both the request and the response;

utilizing local trusted computing principles to assure the protection of private keys and message generation; and measuring computational environment including any attestation signatures within the message process to assure the measured state of the computational environment.

16. The computer-implemented method of claim 15, further comprising:

enabling the user to confirm that the message sent is the intended message by using client technologies of secure display;

displaying the whole request or only the signature for the request or a portion of the request; and confirming the message, by the user, using a secure consent method, a button, a pin/password, a biometric or a token.

17. The computer-implemented method of claim 15, further comprising, leveraging the technologies of Trusted Platform Modules and trusted computing standards to protect keys and validate signatures.

18. The computer-implemented method of claim 15, further comprising, leveraging the technologies of Trusted Execution Technology and Arm Trustzone to protect keys and validate signatures.

19. The computer-implemented method of claim 15, further comprising, leveraging the technologies of Intel Manageability Engine and VPRO technologies to protect keys and validate signatures.

20. A computer-based system to verify trustworthiness of an artificial intelligence (AI) system, the system comprising:

at least one processor; and a memory with computer code instructions stored thereon, the at least one processor and the memory, with the computer code instructions, configured to cause the system to:

computationally verify a digitally signed response from an identified specific artificial intelligence (AI) system operating in a measured environment by:

configuring a digitally signed request using a private key associated with a client system;

transmitting the digitally signed request to a data assurance computing system with a public key configured to verify an integrity of the digitally signed request;

validating, at the data assurance computing system, the digitally signed request by transmitting the digitally signed request to the artificial intelligence (AI) system through a secure application programming interface (API) call;

configuring, by the data assurance computing system, a digitally signed response binding identity and assurance data from the artificial intelligence (AI) system using keying material provided in the digitally signed request; and verifying at the client system that the digitally signed response is the result of a specific verified request by authenticating the digitally signed response digital signature, and the binding identity and assurance data configured by the data assurance computing system.

* * * * *